(12) United States Patent
Routt et al.

(10) Patent No.: US 8,756,869 B1
(45) Date of Patent: Jun. 24, 2014

(54) IN-GROUND STORM SHELTER WITH SLIDING DOOR

(75) Inventors: Brian R. Routt, Moore, OK (US); Dennis M. Brewer, Noble, OK (US); Richard C. Yarber, Moore, OK (US)

(73) Assignee: Smart Shelters, Inc., Oklahoma City, OK (US)

( * ) Notice: Subject to any disclaimer, the term of this patent is extended or adjusted under 35 U.S.C. 154(b) by 0 days.

(21) Appl. No.: 13/597,579

(22) Filed: Aug. 29, 2012
(Under 37 CFR 1.47)

Related U.S. Application Data

(60) Provisional application No. 61/528,423, filed on Aug. 29, 2011.

(51) Int. Cl.
*E04H 9/14* (2006.01)
*E02D 29/14* (2006.01)
*E05C 19/02* (2006.01)

(52) U.S. Cl.
USPC ............. 52/20; 52/169.6; 49/33; 292/95

(58) Field of Classification Search
USPC ............ 52/19, 20, 29, 169.6; 49/33, 50, 449; 109/1 S, 59 R, 73; 292/95, 113, 121, 292/126, 219, 226, 198, 200, 203, DIG. 11; 220/246, 324, 326, 811, 812, 827
See application file for complete search history.

(56) References Cited

U.S. PATENT DOCUMENTS

| | | | |
|---|---|---|---|
| 175,013 A * | 3/1876 | Billings | .................... 292/121 |
| 951,192 A | 3/1910 | Massey | |
| 1,184,190 A | 5/1916 | McIntyre | |
| 1,552,132 A * | 9/1925 | Frasch | .................... 292/127 |
| 2,403,065 A | 11/1943 | Engert | |
| 2,632,665 A * | 3/1953 | Lute | .................... 292/198 |
| 3,114,153 A | 1/1962 | Pierson | |
| 3,806,174 A * | 4/1974 | Herman | .................... 292/113 |
| 4,057,020 A * | 11/1977 | Halliar et al. | .......... 105/377.11 |
| 4,230,351 A * | 10/1980 | Bisbing | .................... 292/223 |
| 4,302,037 A * | 11/1981 | Nunez | .................... 292/128 |
| 4,564,230 A | 1/1986 | Haist | |
| 5,003,797 A | 4/1991 | Wirth et al. | |
| 5,465,462 A | 11/1995 | Yamada | |
| 5,511,835 A | 4/1996 | Hardee | |
| 5,683,201 A | 11/1997 | Guaron | |
| 5,901,990 A | 5/1999 | McMillan | |
| 5,983,939 A | 11/1999 | Heimann et al. | |
| 6,099,197 A | 8/2000 | Gauron | |
| 6,161,345 A | 12/2000 | Hope et al. | |
| 6,453,530 B1 | 9/2002 | Kao | |

(Continued)

*Primary Examiner* — Robert Canfield
(74) *Attorney, Agent, or Firm* — Mary M. Lee (57) ABSTRACT

An in-ground storm shelter for installation in the floor of a structure. The door is substantially flush with the floor and comprises two panels, one sliding over the other, so as to occupy as little floor space as possible. A spring-biased latch on the leading edge of the sliding door automatically latches the closed door to a rail on the front edge of the enclosure as the door is slid shut. The latch may comprise a pair of handles, each with a grip hole. The latch is releasable from outside the shelter using the end of a handrail that acts on the latch through a latch release window in the sliding door. The shelter may also include a safety chain that extends through the grip holes in the latch handles. A security lock may be included so that the shelter may serve as a safe or secure storage.

28 Claims, 12 Drawing Sheets

(56) References Cited

U.S. PATENT DOCUMENTS

| | | | |
|---|---|---|---|
| 6,550,824 B1 * | 4/2003 | Ramsauer | 292/126 |
| 6,595,716 B1 | 7/2003 | VanDeVyvere et al. | |
| 7,428,800 B1 | 9/2008 | Vaughn et al. | |
| 7,578,531 B1 * | 8/2009 | Leontaridis | 292/11 |
| 7,591,492 B2 * | 9/2009 | Nikkhah | 292/100 |
| 7,690,159 B1 | 4/2010 | Arnold | |
| 7,798,544 B1 | 9/2010 | Bates | |
| 7,908,798 B2 | 3/2011 | Monneret | |
| 7,975,515 B2 | 7/2011 | Ygnelzi et al. | |
| 8,061,165 B1 * | 11/2011 | Cassini | 70/99 |
| 8,176,692 B2 | 5/2012 | Crow | |
| 2003/0167708 A1 | 9/2003 | Shaw et al. | |
| 2010/0300007 A1 * | 12/2010 | Bunts, Sr. | 52/11 |
| 2012/0079780 A1 * | 4/2012 | Wirtz | 52/169.6 |
| 2012/0216463 A1 * | 8/2012 | Crow | 52/19 |
| 2013/0103119 A1 * | 4/2013 | Yamanaka et al. | 607/62 |

* cited by examiner

IN-GROUND STORM SHELTER WITH SLIDING DOOR

CROSS-REFERENCE TO RELATED APPLICATIONS

This application claims the benefit of U.S. Provisional Application No. 61/528,423, entitled "Sub-Floor Storm Shelter with Sliding Door," filed Aug. 29, 2011, the contents of which are incorporated herein by reference.

FIELD OF THE INVENTION

The present invention relates generally to storm shelters and, more particularly but without limitation, to sub-floor storm shelters with sliding doors.

DETAILED DESCRIPTION OF THE PREFERRED EMBODIMENT(S)

In those areas where tornadoes are common, in ground storm shelters save many lives. The present invention relates to sub-floor storm shelters, that is, storm shelters that are installed beneath the floor of a structure with a floor, such as the concrete slab or floor in a garage. Sub-floor storm shelters in garages are popular because they are easily accessible without having to go out into the storm.

The storm shelter of the present invention is constructed so that the top of the shelter is substantially flush with the concrete slab and at the same time to require as little floor space as possible even when in the open position. Although the shelter is ideally suited for installation inside a structure, in the event of a direct hit by a tornado the entire structure may be demolished or even dislocated. Thus, it is important that the closure of such shelters include an internally operable latch that resists breakage or failure even under severe tornado conditions. At the same time, the latch must be easily operable by children and the elderly or any person whose strength or coordination is compromised. The present invention provides such a latch assembly.

The access door of the inventive shelter is a sliding door that rides on bearings and moves quickly with little effort. The latch assembly is designed to latch automatically as the door is pushed shut. A safety chain provides additional protection and, in accordance with a preferred embodiment of this invention, the latch assembly coordinates with the safety chain. More specifically, the latch handles have openings that serve as both a handhold as well as an opening through which to pass the safety chain.

When the storm has passed, and the occupants prepare to exit the shelter, the latch must be released. However, as indicated, the occupants may be only children or elderly persons so, in addition to being easy to engage and resistant to tornadic wind forces, the latch assembly must be releasable. In accordance with the preferred practice of the present invention, the latch assembly comprises a pair of similarly formed latch handles with grip holes large enough for an adult human hand. In this way, the occupant can grab one handle in each hand for exerting maximum force. This may be necessary if large, heavy debris has been strewn across the top of the access opening. These and other advantages of the present invention will become apparent from the detailed description of the preferred embodiment which follows.

Figure 1:
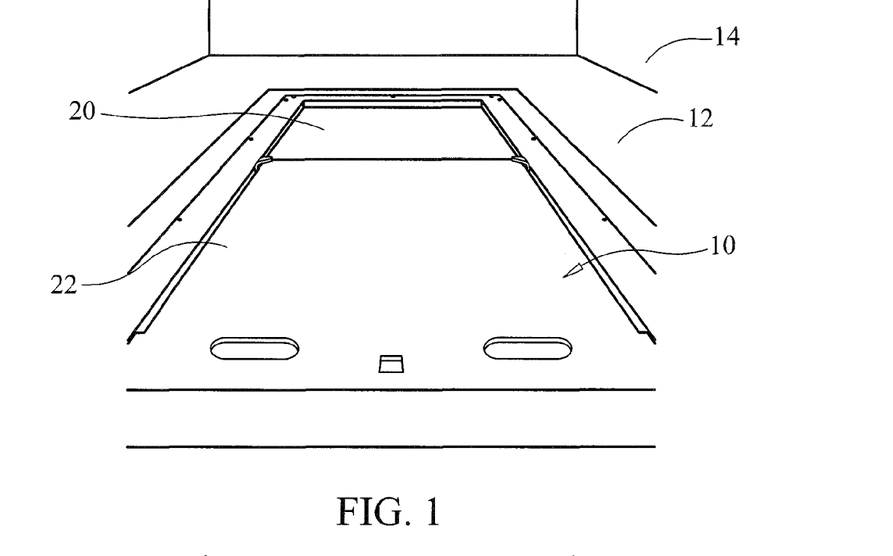
FIG. 1 is a perspective view of a storm shelter constructed in accordance with a preferred embodiment of the present invention. The shelter is installed below a garage floor with the sliding door generally flush with the concrete floor. The sliding door is shown in the closed position.
Figure 2:
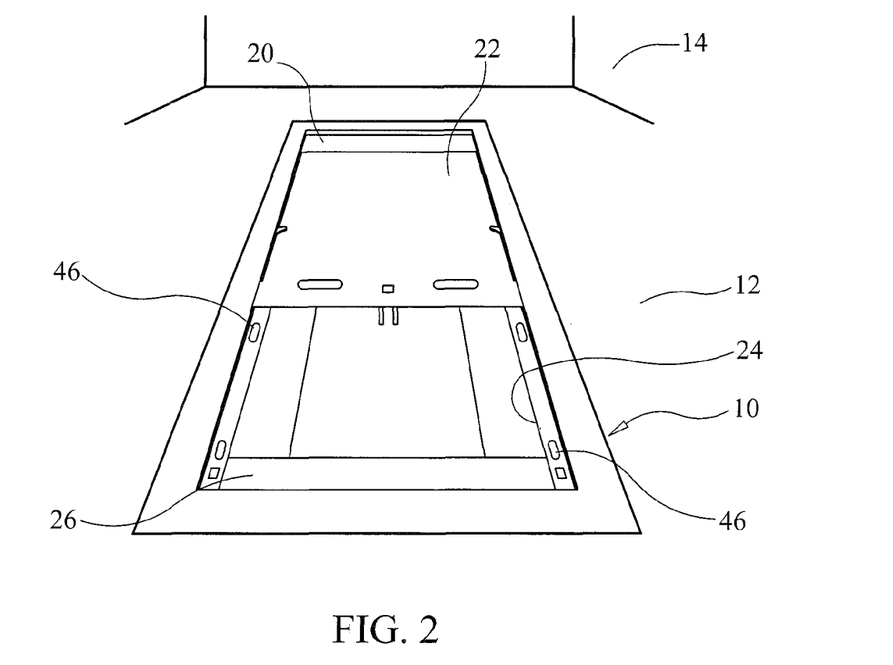
FIG. 2 is another perspective view of the installed storm shelter shown in FIG. 1 with the sliding door in the open position.

Turning now to the drawings in general and to FIG. 1 in particular, there is shown therein an in-ground storm shelter constructed and installed in accordance with a preferred embodiment of the present invention and designated generally by the reference number 10. The shelter 10 is shown installed in the floor 12 of a structure 14 such as a garage. In FIG. 1, the access opening of the shelter is covered by a pair of panels, one stationary panel 20 over the rear of the opening and a sliding panel or door 22 over the front of the opening. FIG. 2 illustrates the installed shelter sliding door 22 in the open position, exposing the access opening 24 and to the stairs 26 leading down into the safety of the enclosure.

Figure 3:
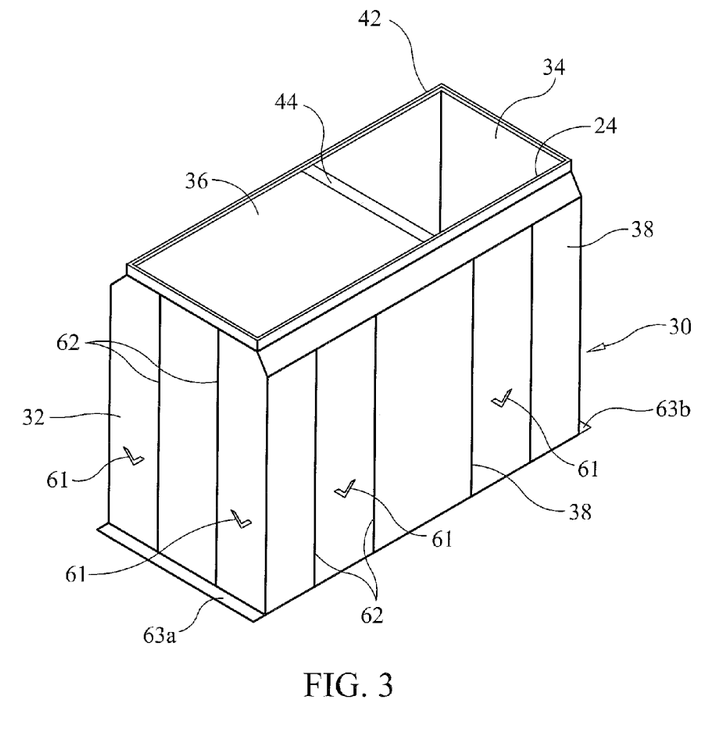
FIG. 3 is a perspective view of the assembled enclosure showing the access opening in the top.
Figure 4:
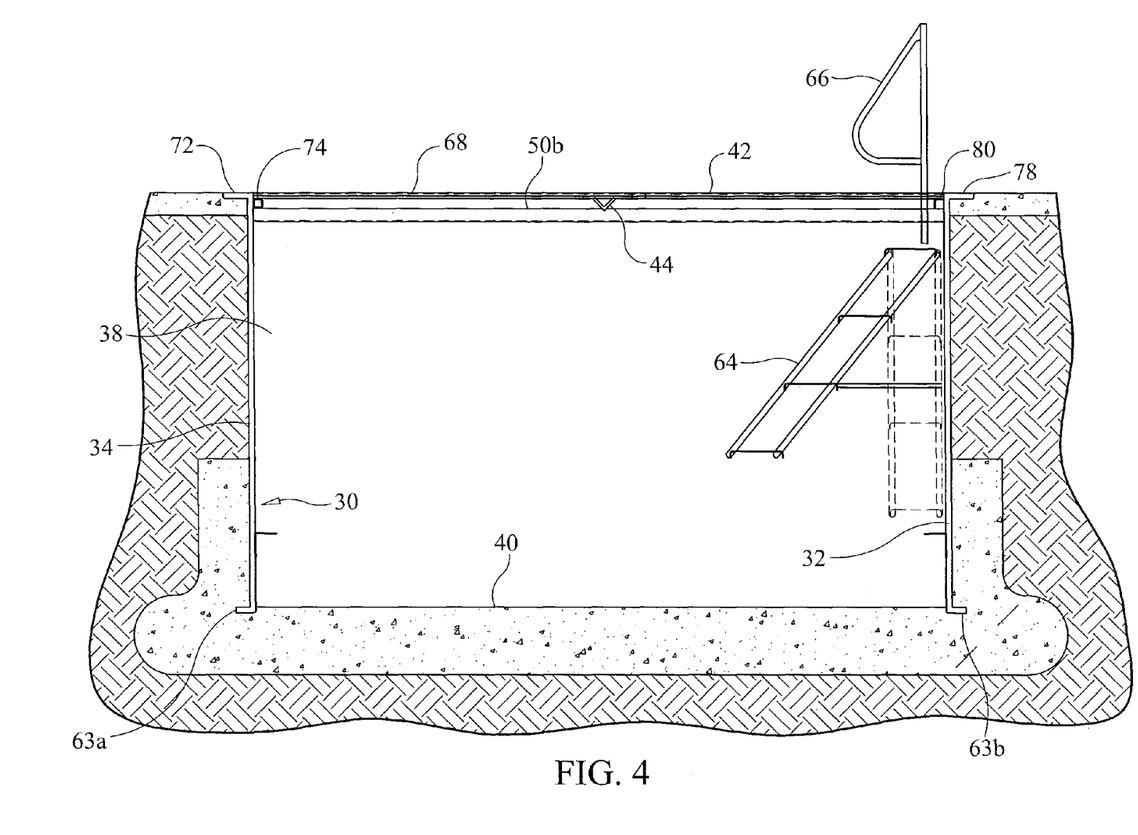
FIG. 4 is a side sectional view of the installed storm shelter showing the position of the shelter relative to the concrete slab and excavation in which it is placed.

As shown in FIG. 3, the preferred form for the enclosure 30 is generally rectangular and is conveniently formed by welding together front and rear panels 32 and 34, side panels 36 and 38, and a floor 40 (see FIG. 4). The top 42 defines the access opening 24, also general rectangular. The shape and dimensions may vary. A cross bar 44 provides added rigidity and also assists with installation. Additionally, the cross bar 44 supports the doors 20 and 22 at the point where they overlap.

The procedure for installing in-ground shelters is known and will be summarized only. An opening is cut in the concrete floor with a masonry saw, and the ground beneath is excavated using a back hoe or other suitable machinery. The excavation is widened slightly at the bottom (FIG. 4), and a base of concrete is installed to provide a solid floor to the enclosure. Next, the enclosure 30, usually without the doors, is then lifted and placed into the excavation.

Ground water may tend to accumulate in the excavation from time to time. Since the enclosure is water tight, this accumulating water may cause a buoyancy problem. The widened concrete base, seen in FIG. 4, will hold the enclosure in position preventing any movement of the shelter due to water accumulation.

Finally, if necessary, concrete is spread around the periphery of the shelter top so that the top of the shelter is flush with the pre-existing floor 12. Once the surrounding concrete is cured, the stationary and sliding doors 20 and 22 (FIGS. 1 & 2) are installed. In some models, with separate flanges, the flange pieces are attached to the side and end panels and then pinned to the existing concrete floor. Now, the shelter is ready for use.

Figure 5:
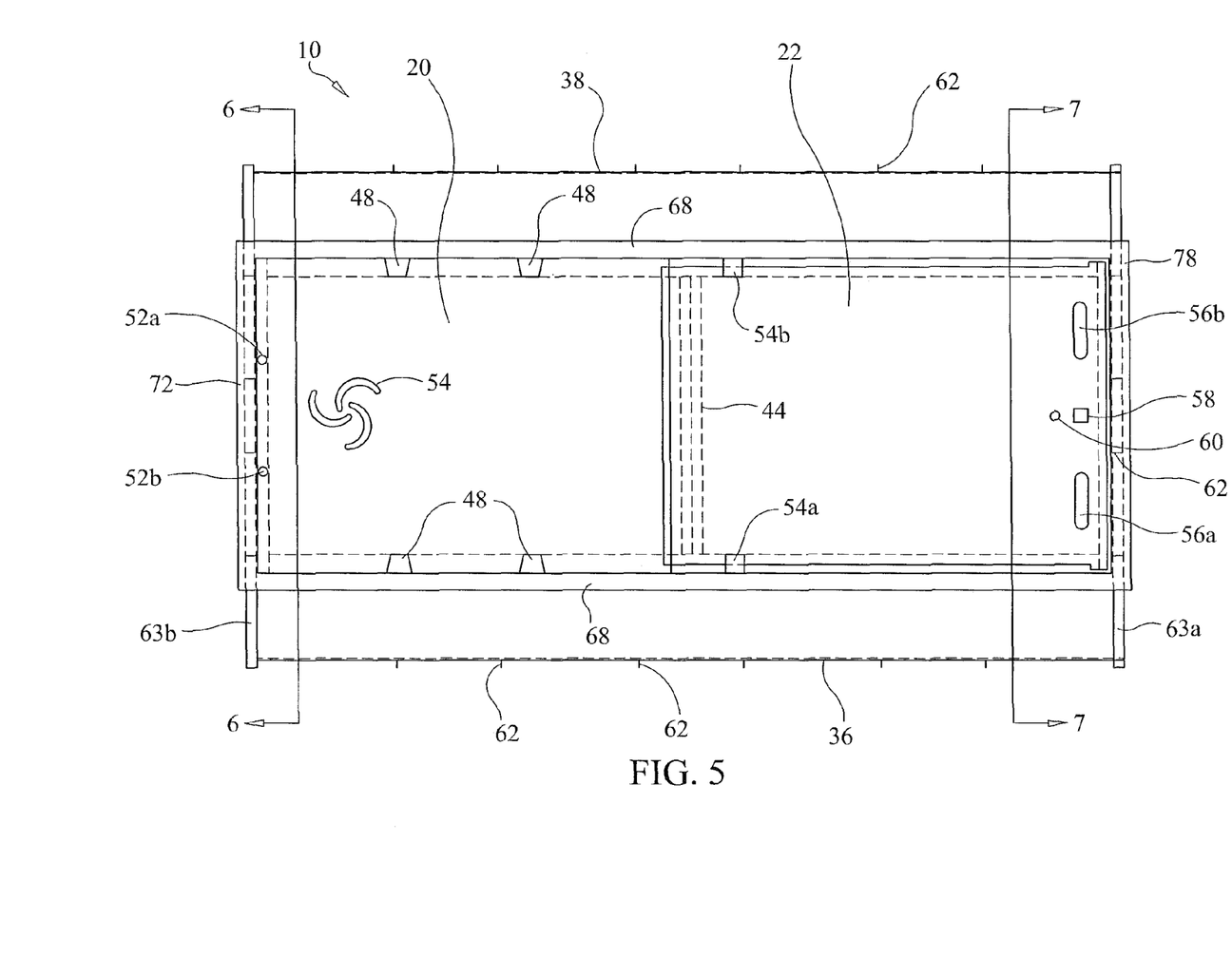
FIG. 5 is a plan view of the assembled shelter with the doors in the closed position. The positions of the rear hinge locks, bearings, and latch assembly are shown in broken lines.
Figure 6:
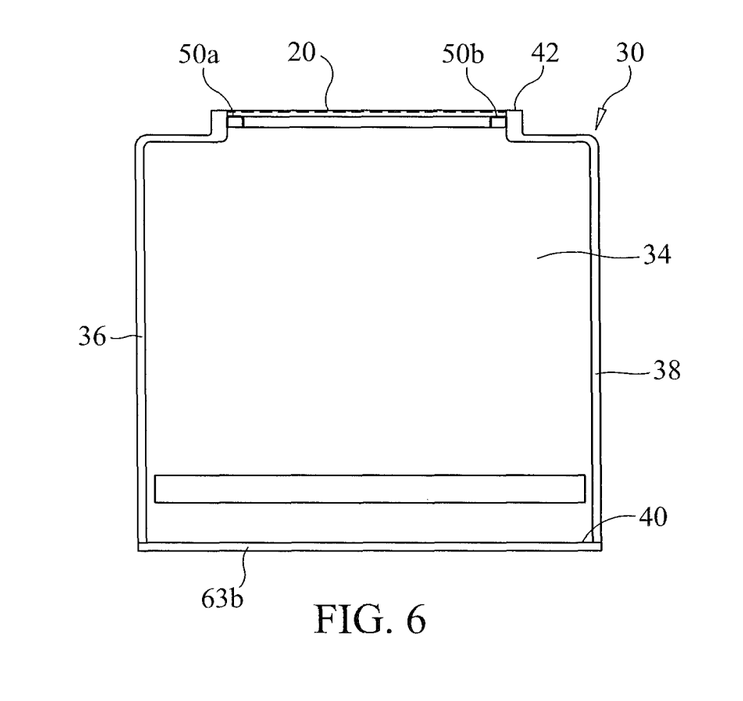
FIG. 6 is a section view taken along the line 6-6 in FIG. 5.
Figure 7:
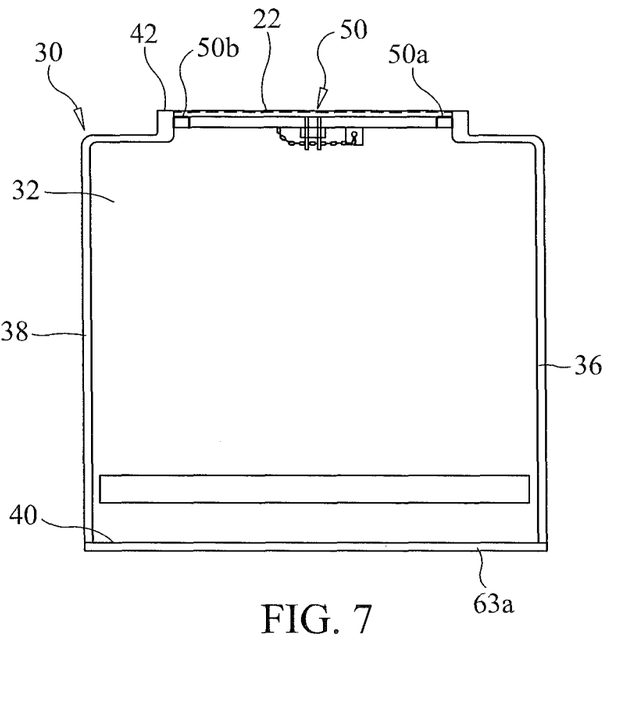
FIG. 7 is a section view taken along line 7-7 in FIG. 5.
Figure 10:
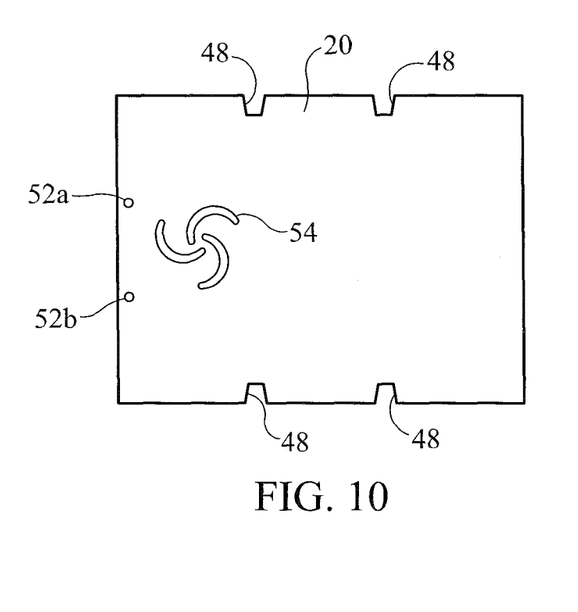
FIG. 10 is a plan view of the stationary panel.
Figure 11:
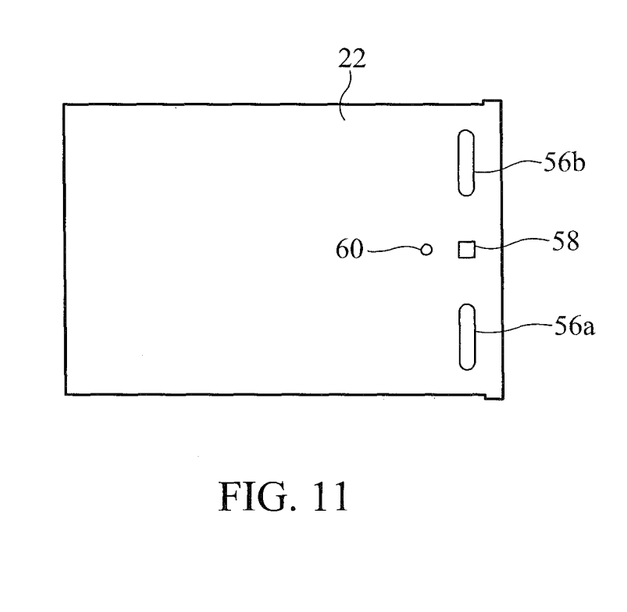
FIG. 11 is a plan view of the sliding door panel.

Referring now to FIGS. 5-11, the panels 20 and 22 ride on bearings 46 (FIGS. 2 & 12-15,) carried in the side rails 50*a* and 50*b* (FIGS. 6 & 7). As indicated previously, the rear panel 20 is stationary. As best seen in FIGS. 5 and 10, the panel 20 includes cut-outs 48 to receive the bearings 46 (see also FIG. 16) to support the sliding panel 22 as it moves back and forth over the stationary panel 20. The panel 20 is removable so that in the event of damage to the sliding door 22, the rear door 20 can be lifted off to exit the shelter. The rear door 20 is held in place at the rear with hardened pins 52*a* and 52*b*. The pins 52*a* and 52*b* extend through door and the underlying structure and are held in place with a hairpin 53 or bridge pin. (See FIG. 15) In this way, the pins 52*a* and 52*b* can be removed to release the door 20. The front end of the rear door 20 is underneath the sliding door 22.

The sliding door 22 is held in place at the rear by lockdown tabs 54*a* and 54*b*, described in more detail below and at the front by a latch assembly, as described more fully below. The sliding door 22 may be equipped with hand holes 56*a* and 56*b*. Additionally, a latch release window 58 is included near the leading edge of the door 22 for a purpose which will become apparent.

Although the expense of an in-ground storm shelter is more than justified by its purpose of providing safety in a storm, it may be multi-functional. That is, it may serve as a safe for valuables. To that end, a security lock 60 may be included in the door 22. The security lock 60 may be configured several ways. In the preferred embodiment shown, the lock is designed so that, when in the locked position, the lock prevents the rocker bar (described below) from tilting back far enough to disengage the latch. Alternately, the security lock could be independent of the latch, such as a dead bolt that engages the side panels or rails in some fashion. As used herein, "security lock" means a keyed lock, a combination lock, or an electronic lock. This second security lock will prevent unauthorized entry into the shelter by thieves and vandals as well as mischievous children.

Figure 8:
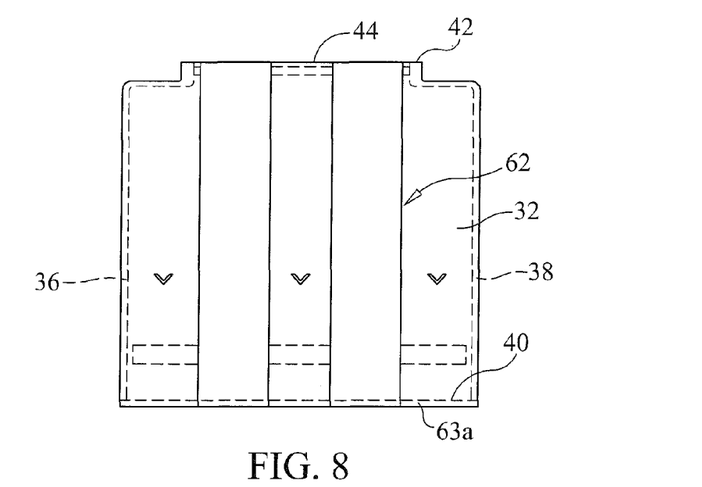
FIG. 8 is a front end elevational view of the assembled shelter.
Figure 9:
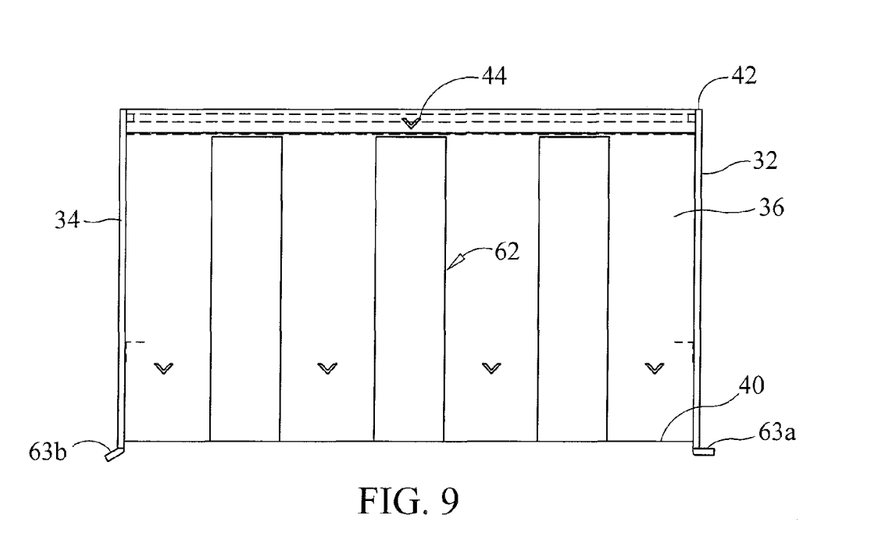
FIG. 9 is a left side elevational view of the assembled shelter.

The front, rear, and side panels 32, 34, 36, and 38 may be provided with support ribs, designated collectively at 62, as best seen in FIGS. 3, 8 and 9, to provide additional strength. Further, angled V-tabs 61 may be included on the ends and sides. These protruding stabs dig into the surrounding earth and concrete and help to stabilize the enclosure 30. Additionally, as seen in FIGS. 4, 6 and 7, a short flange or foot 63*a* and 63*b* is provided along the bottom edge of the front and rear panels 32 and 34.

In most cases it is desirable to include a battery-operated ventilation fan (not shown). For this purpose an air vent 54 (FIGS. 5 & 10) is provided in the stationary panel 20. As see in FIG. 4, stairs 64 may be provided near the front of the enclosure 30 for stepping down into the shelter 10. These stairs may be folding, as shown, or may be removable slats that fit on brackets. Still further, a handrail 66, shown only in FIG. 4, is included to assist users in descending the stairs or ladder. A holster 67, shown in FIG. 16, may be mounted near the front panel 32 for standing the handrail 66 while the shelter 10 is being entered and exited. Benches, not shown, are also included.

Figure 12:
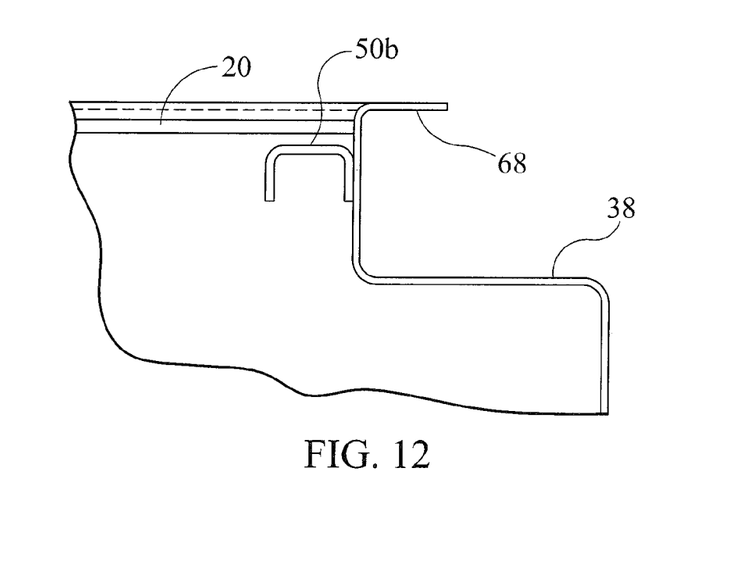
FIG. 12 is an enlarged, sectional view of a section of a side of the assembled shelter showing the profile of the bearing rail.

FIG. 12 is an enlargement through a section of the side 38 of the assembled shelter 10. In this view, the profile of the top of the enclosure is apparent. The side wall 38, which preferably is integrally formed, includes an outwardly turned flange 68, which will slightly overlap the concrete surrounding the installed enclosure. As indicated previously, in some cases, the flange may be a separate strip of metal that is pin to the pre-existing concrete.

Figure 13:
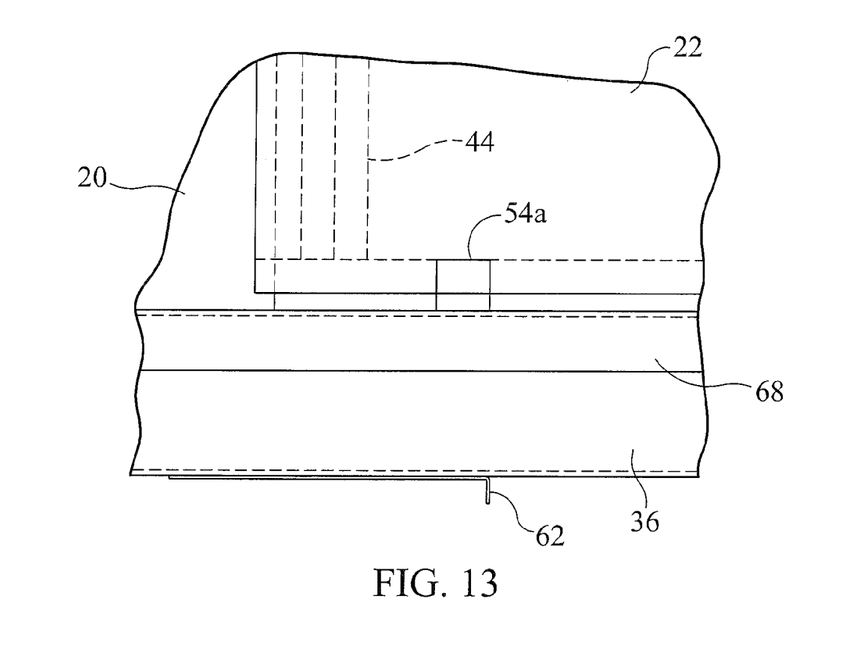
FIG. 13 is an enlarged, fragmented view of a section of the top of the assembled shelter showing one of the lockdown tabs in detail.
Figure 14:
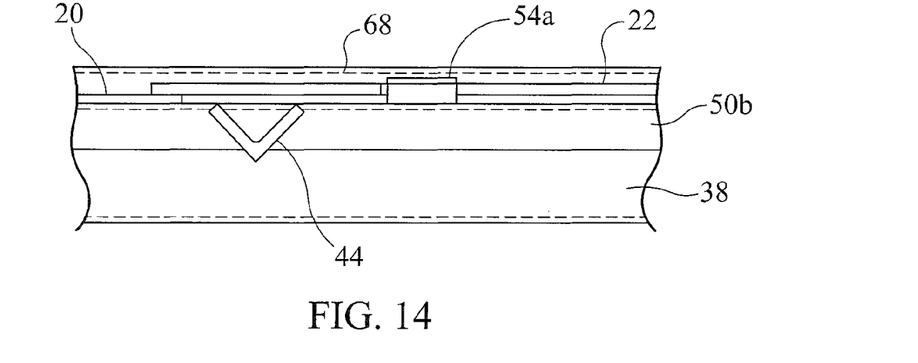
FIG. 14 is an enlarged, fragmented view of a section of the side of the assembled shelter showing one of the lockdown tabs in detail.

Referring now to FIGS. 13 and 14, the locking tabs 54*a* and 54*b* (see FIG. 5 for 54*b*) will be described. The locking tabs 54*a* and 54*b* extend inwardly from each side panel 36 and 38 at about the level of the flange 68. The number, shape and configuration of the tabs 54*a* and 54*b* may vary. They may be simply welded to the inside edge of the side panels 36 and 38.

Figure 15:
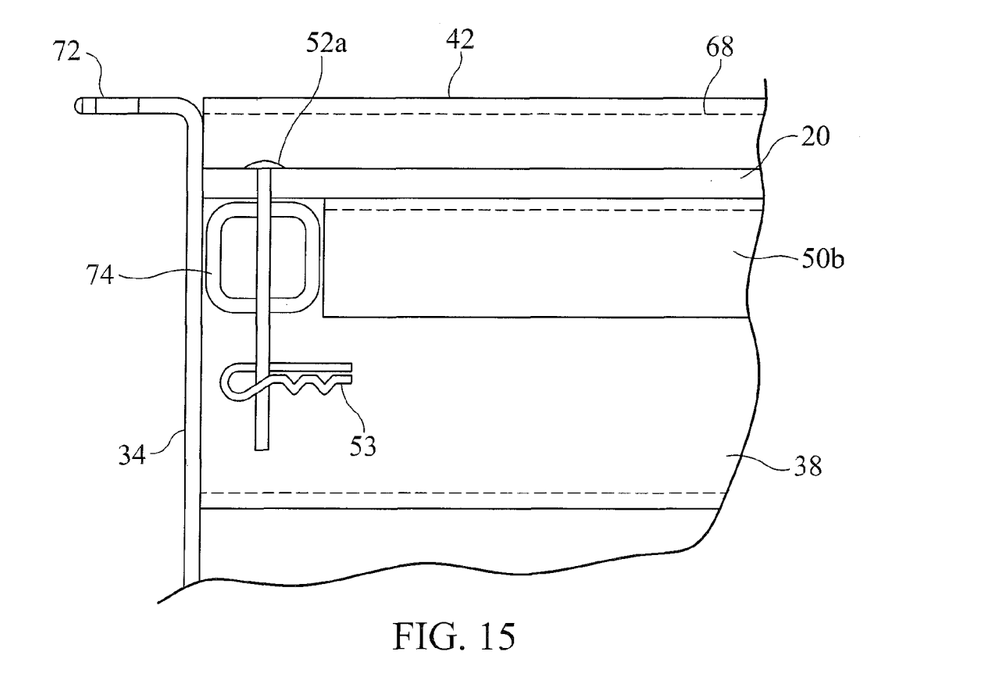
FIG. 15 is an enlarged, fragmented view of a rear corner of the assembled unit showing the profile of the tubular member.

FIG. 15 is an enlargement through a section of the back or rear panel 34 of the assembled shelter 10. In this view, the profile of the top 42 of the enclosure is apparent. The rear panel, which preferably is integrally formed, includes an outwardly turned flange 72, which will slightly overlap the concrete surrounding the installed enclosure. Also shown in this view is the tubular reinforcing bar 74, which extends along the upper edge of the back panel 34 between the side panels 36 (not shown in this view) and 38. The rear of the rear stationary door 20 is attached to the bar 74 with a hardened pin 52*a* secured with a hairpin or bridge pin 53. This type of connector is relatively easy to remove if it becomes necessary to remove the rear door 20.

Figure 16:
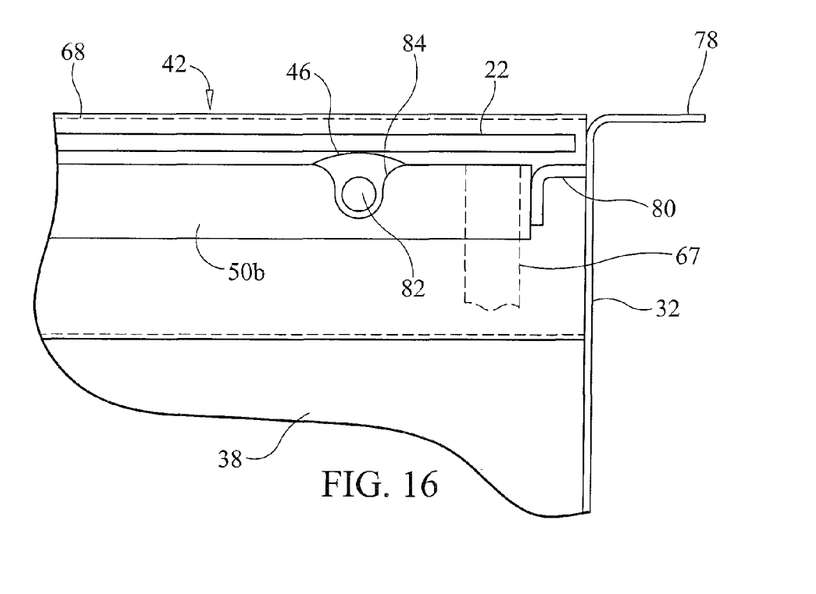
FIG. 16 is a fragmented, sectional view through the top of the front panel of the assembled shelter showing the profile of the latch rail.

Turning now to FIG. 16, the front of the shelter 10 will be explained. Like the rear and side panels, the front panel 32 preferably is provided with an outwardly turned flange 78 for overlapping the surrounding concrete. Attached across the top of the front panel 32 is a latch rail 80, which will coact with the latch assembly (omitted from this view), described hereafter, to secure the sliding door 22 in the closed position. One of the bearings 46 is also illustrated in this view. The bearing 46 is rotates on a through-rod 82 that that is welded or otherwise fixed in a cut-out 84 provided in the rail 50*b*.

With reference now to FIGS. 17-20, a preferred latch assembly will be described. As indicated, the shelter 10 preferably includes spring-biased latch assembly, designated herein as 90, configured to automatically latch the sliding door 22 to the enclosure 30 when the sliding door is moved into the closed position (see FIGS. 1 and 5).

In its most preferred form, the latch assembly comprises a pair of brackets 92*a* and 92*b* (FIG. 19) secured, such as by welding, to the underneath surface of the sliding door 22. A pivot bar 94 is supported for rotation in the brackets 92*a* and 92*b*. In between the brackets, and fixed on the pivot bar 94 is at least one and preferably a pair of similarly formed handles 96a and 9b. Each handle 96a and 96b includes a grip holes 100a and 100b sized to receive an adult human hand.

Figure 19:
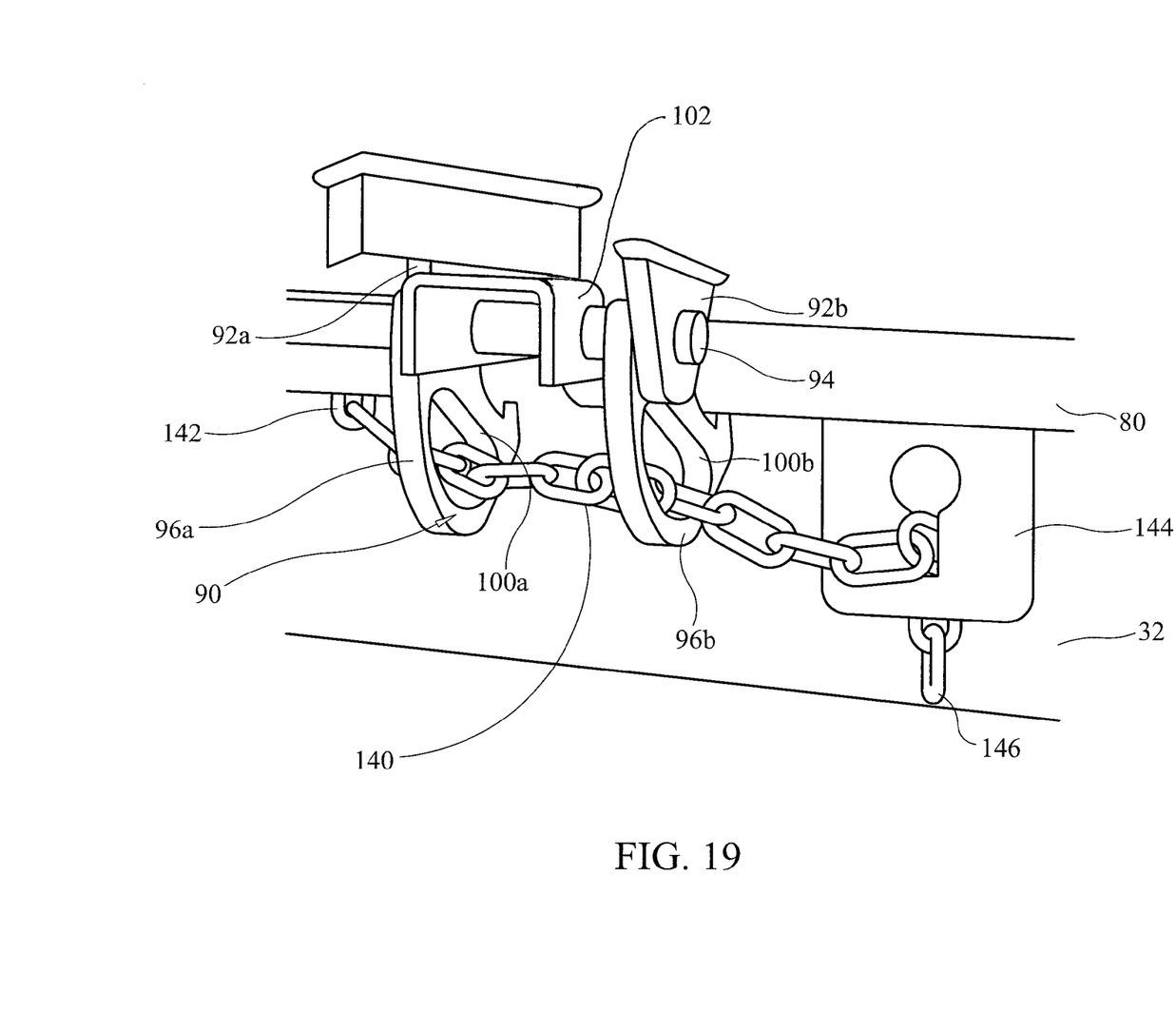
FIG. 19 is a perspective view of the assembled latch assembly in the latched or closed position with the safety chain connected.

A rocker bar 102, which may take the form of a U-shaped bar, is fixed to the pivot bar 94 between the handles 96a and 96b. A coil spring 106 is supported between rear end 108 of the rocker bar 102 and the sliding door 22. The coil spring 106 is configured to bias the rocker bar 102 with the rear end 108 further from the door 22 than the forward end 110. While a coil spring is shown, any type of spring may be employed for this purpose. Now it will be appreciated that the rocker bar 102 and the handles 96a and 96b are mounted for see-saw like pivoting motion relative to the door 22.

Figure 17:
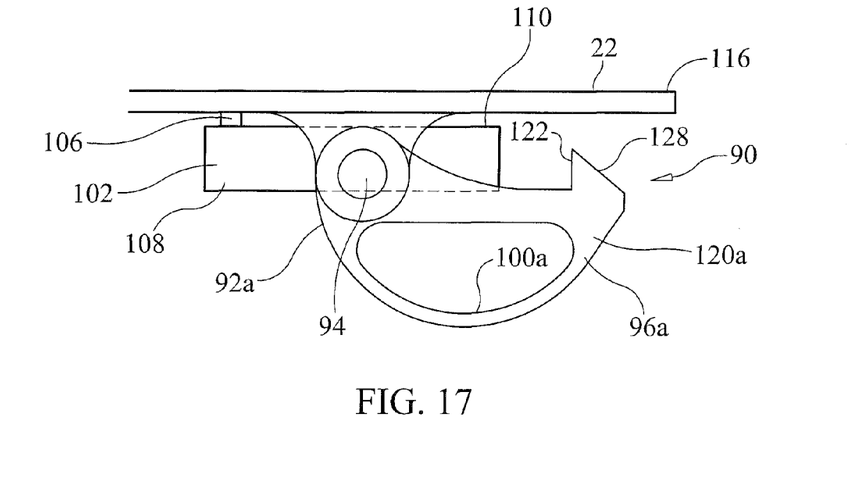
FIG. 17 is an enlarged, side elevational view of the side of the latch assembly.
Figure 20:
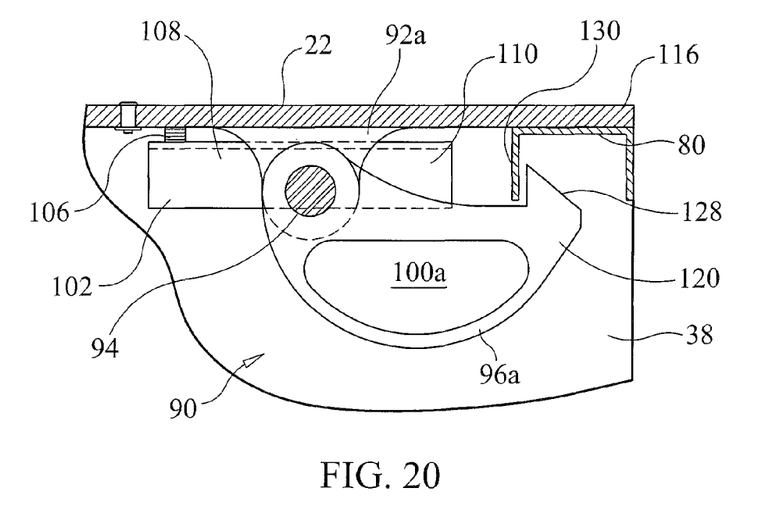
FIG. 20 is an enlarged sectional view through the center of the latch assembly showing how the frontal hook of the latch grips the latch rail on the front of the enclosure.

The latch assembly 90 is mounted near the leading edge 116 of the sliding door 22, and each of the handles 96a and 96b is configured with a frontal hook 120, best shown in FIGS. 17 and 20. Each frontal hook 120 defines a latch recess 122 (FIG. 17) designed to hook up under the latch rail 80 on the front panel 32 (FIG. 20) when the door 22 is in the closed position. The leading edge 128 of the frontal hook 120 slanted or angled off the vertical so that as the sliding door 22 is moved toward the closed position and frontal hook is urged into the latch rail 80, the frontal hook will be forced downward, slightly pivoting the handles 96a and 96b and rocker bar 102 under in a cam-like action so that the front end 110 of the rocker bar tilts downward compressing the spring 106. Once the hook 120 clears the downward flange 130 (FIG. 20) of the latch rail 80, the hook will slide or slip up under the flange and the spring 106 will expand and urge the rocker bar back into the resting position, urging the hook up under the rail 80 and securing the door 22 in the latched or closed position.

To release the latch assembly 90 from inside the shelter 10, one simply grips the latch handles 96a and 96b, one in each hand, and pulls downwardly to overcome the counterforce of the spring 106. Now it will be appreciated that having two handles, while not essential, is much preferred. Additionally, while the handles are shown only a few inches apart, the distance between the handles may vary. The narrow distance shown herein, about 3 inches, provides a stronger latch force and is easier for most people to grip.

Returning for a moment to FIGS. 5 and 11, the purpose of the latch release window 58 will be explained. The latch release window 58 is positioned immediately over the front end 110 of the rocker bar 102. Thus, when the latch assembly 90 is engaged, the spring 106 will continuously urge the front end 110 of the rocker bar up against the window 58. The window 58 is conveniently sized to receive the lower end of the handrail 66 (FIG. 4), which typically is formed of tubular metal. By pushing the lower end of the handrail 66 down into the window 58 and pushing down on the front end 110 of the rocker bar 102, the latch is released from outside the shelter 10.

The security lock 60, mentioned above, may be configured to act on the rear end 108 of the rocker bar 102. A throw bolt (not shown) positioned by a key, for example, may move in and out under the end 108 of the rocker bar 102 so that in the locked position pressure on the front end 110 of the rocker bar will not move it.

Figure 18:
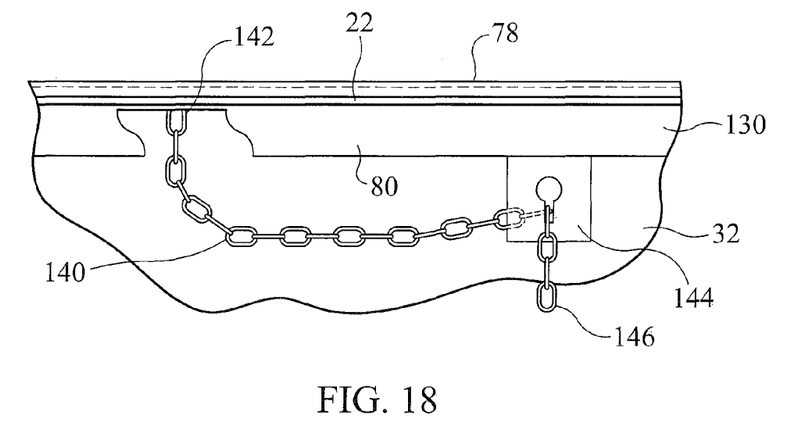
FIG. 18 is an enlarged, fragmented view of the top front of the assembled shelter showing the safety chain connected. The latch assembly is omitted for clarity of illustration.

For added protection against inadvertent opening of the sliding door 22, a safety chain may be employed. As shown in FIG. 18, the safety chain 140 is about 10-20 inches long. One end 142 is fixed, as by welding to the front panel 32. For example, the end 142 end may be welded up under the flange 130 of the latch rail 80 a few inches to the side of the latch assembly 90. Also fixed to the front panel 32, a few inches to the other side of the latch assembly 90 is a keyhole tab 144 for receiving the free end 146 of the chain 140. Now another important feature of the preferred latch assembly 90 will be apparent. With the safety chain 140 mounted in this manner, the chain 140 can be threaded through the grip holes 100a and 100b. In this way, the forces of the chain 140 and the latch assembly 90 cooperate to prevent the door 22 from being blown open by winds or dislodged by debris.

For the purpose of this description, the words left, right, front, rear, top, bottom, inside and outside may be used to describe the various parts and directions of the invention as depicted in the drawings. These descriptive terms should not be considered as limiting the possible orientations of the invention or how it may be used. The terms are used to merely describe the various parts and directions so they may be readily understood and located in the drawings.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims

What is claimed is:

1. A storm shelter for installation in the ground under the floor of a structure, the storm shelter comprising:
    an enclosure comprising a top with an access opening;
    a sliding door slidably mounted on the top of the enclosure for movement between an open position and a closed position over the access opening; and
    a spring-biased latch assembly configured to automatically latch the sliding door to the enclosure when the sliding door is moved into the closed position, wherein the latch assembly comprises a pair of similarly formed latch handles, wherein each of the pair of latch handles defines a grip hole large enough to receive a human hand.

2. The storm shelter of claim 1 wherein the pair of similarly formed latch handles are pivotally mounted to the undersurface of the sliding door, and wherein the latch handles are positioned near the leading edge of the sliding door relative to the front of the enclosure.

3. The storm shelter of claim 2 wherein the front of the enclosure comprises a latch rail and wherein each of the pair of similarly formed latch handles includes a frontal hook with a latch recess positioned to engage the latch rail when the sliding door is in the closed position.

4. The storm shelter of claim 3 wherein the frontal hook on each of the pair of similarly formed latch handles has a slanted leading edge configured so that, as the sliding door is moved toward the closed position and the frontal hook of the latch handle is urged into the latch rail, the frontal hook will slide under the latch rail until the latch rail is received in the rail recess, thereby locking the sliding door in the closed position.

5. The storm shelter of claim 4 wherein the latch assembly further comprises a rocking bar between the latch handles, the rocking bar being fixed for pivotal movement with the latch handles, the rocking bar having a rear end and front end, wherein the sliding door includes a latch release window, and wherein the front end of the rocking bar is accessible through the latch release window to release the latch assembly.

6. The storm shelter of claim 5 wherein the latch assembly comprises a coil spring to provide the spring bias to the latch handles and wherein the coil spring is positioned to act on the rear end of the rocking bar.

7. The storm shelter of claim 6 wherein the latch assembly comprises a pivot bar supported for rotation in a pair of spaced apart brackets, wherein the latch handles are fixed to the pivot bar for rotation therewith, and wherein the rocking bar is fixed to the pivot bar between the latch handles.

8. The storm shelter of claim 7 wherein the latch handles are adjacent the rocking bar.

9. The storm shelter of claim 8 further comprising a safety chain for securing the sliding door to the enclosure and wherein the safety chain is configured to extend through the grip holes in the latch handles.

10. The storm shelter of claim 9 further comprising a handrail with a lower end sized to extend through the latch release window to move the front end of the rocker bar to release the latch assembly.

11. The storm shelter of claim 1 wherein the storm shelter further comprises a safety chain for securing the sliding door to the enclosure, and wherein the safety chain is configured to extend through the grip hole in the latch handles.

12. The storm shelter of claim 1 wherein the latch assembly is releasable from outside the shelter.

13. The storm shelter of claim 12 wherein the latch assembly further comprises a pivotally mounted rocker bar having a rear end and a front end, and wherein the latch assembly further comprises a coil spring to provide the spring bias the latch assembly, and wherein the coil spring is positioned to act on the rear end of the rocking bar.

14. The storm shelter of claim 13 wherein the sliding door includes a latch release window, and wherein the front end of the rocking bar is accessible through the latch release window to release the latch assembly.

15. The storm shelter of claim 14 further comprising a handrail and wherein the handrail includes an end sized to extend through the latch release window to move the front end of the rocker bar to release the latch assembly.

16. The storm shelter of claim 1 wherein the top of the enclosure and the sliding door are substantially flush with the floor of the structure.

17. The storm shelter of claim 1 further comprising a security lock on the exterior of the sliding door for locking the sliding door closed.

18. A storm shelter for installation in the ground under the floor of a structure, the storm shelter comprising:
  an enclosure comprising a top with an access opening;
  a sliding door slidably mounted on the top of the enclosure for movement between an open position and a closed position over the access opening, the sliding door having an underside; and
  a spring-biased latch assembly on the underside of the sliding door and configured to automatically latch the sliding door to the enclosure when the sliding door is moved into the closed position, wherein the sliding door includes a latch release window, wherein the latch assembly further comprises a pivotally mounted rocker bar having an end accessible through the latch release window so that the latch assembly is releasable from outside the shelter.

19. The storm shelter of claim 18 wherein the latch assembly comprises at least one latch handle pivotally mounted to the undersurface of the sliding door, the latch handle positioned near the leading edge of the sliding door relative to the front of the enclosure.

20. The storm shelter of claim 19 wherein the front of the enclosure comprises a latch rail and wherein the at least one latch handle includes a frontal hook with a latch recess positioned to engage the latch rail when the sliding door is in the closed position.

21. The storm shelter of claim 20 wherein the frontal hook on the at least one latch handle has a slanted leading edge configured so that, as the sliding door is moved toward the closed position and the frontal hook of the latch handle is urged into the latch rail, the frontal hook will slide under the latch rail until the latch rail is received in the rail recess, thereby locking the sliding door in the closed position.

22. The storm shelter of claim 18 wherein the latch assembly comprises at least one latch handle, wherein the at least one latch handle defines a grip hole large enough to receive a human hand, wherein the storm shelter further comprises a safety chain for securing the sliding door to the enclosure, and wherein the safety chain is configured to extend through the grip hole in the latch handle.

23. The storm shelter of claim 22 wherein the at least one latch handle comprises a pair of similarly formed latch handles and wherein the safety chain is configured to extend through the grip hole in both of the latch handles.

24. The storm shelter of claim 18 wherein the latch assembly further comprises a pivotally mounted rocker bar having a rear end and a front end, and wherein the latch assembly further comprises a coil spring to provide the spring bias the latch assembly, and wherein the coil spring is positioned to act on the rear end of the rocking bar.

25. The storm shelter of claim 24 wherein the sliding door includes a latch release window, and wherein the front end of the rocking bar is accessible through the latch release window to release the latch assembly.

26. The storm shelter of claim 25 further comprising a handrail and wherein the handrail includes an end sized to extend through the latch release window to move the front end of the rocker bar to release the latch assembly.

27. The storm shelter of claim 18 wherein the top of the enclosure and the sliding door are substantially flush with the floor of the structure.

28. The storm shelter of claim 18 further comprising a security lock on the exterior of the sliding door for locking the sliding door closed.

* * * * *

UNITED STATES PATENT AND TRADEMARK OFFICE
CERTIFICATE OF CORRECTION

PATENT NO.       : 8,756,869 B1
APPLICATION NO.  : 13/597579
DATED            : June 24, 2014
INVENTOR(S)      : Brian R. Routt It is certified that error appears in the above-identified patent and that said Letters Patent is hereby corrected as shown below:

In the Specification:

Column 2, line 8: replace "in ground" with --in-ground--.
Column 2, line 67: replace "general" with --generally--.
Column 3, line 37: replace "through" with --through the--.
Column 4, line 1: replace "stabs" with --tabs--.
Column 4, line 8: replace "see" with --seen--.
Column 4, line 25: replace "pin" with --pinned--.
Column 4, line 54: replace "46 is" with --46--.
Column 4, line 54: replace "that that" with --that--.
Column 4, line 58: replace "includes" with --includes a--.
Column 5, line 1: replace "holes" with --hole--.
Column 5, line 63: replace "142 end may" with --142 may--.

In the Claims:

Column 7, line 33: replace "bias" with --bias to--.

Signed and Sealed this
Eighteenth Day of November, 2014

Michelle K. Lee
*Deputy Director of the United States Patent and Trademark Office*